United States Patent
Mitchell, Jr.

(10) Patent No.: US 7,293,619 B2
(45) Date of Patent: Nov. 13, 2007

(54) FRONT WHEEL MOTOR DRIVEN-GOLF TROLLEY

(76) Inventor: Lawrence Carhart Mitchell, Jr., 9061 NE. 40th Pl., Bellevue, WA (US) 98004

( * ) Notice: Subject to any disclaimer, the term of this patent is extended or adjusted under 35 U.S.C. 154(b) by 214 days.

(21) Appl. No.: 10/845,320

(22) Filed: May 14, 2004

(65) Prior Publication Data
US 2004/0238241 A1 Dec. 2, 2004

Related U.S. Application Data

(60) Provisional application No. 60/474,139, filed on May 29, 2003.

(51) Int. Cl.
*B25D 51/04* (2006.01)
(52) U.S. Cl. .................. 180/19.2; 180/19.3; 180/216
(58) Field of Classification Search .............. 180/19.1, 180/19.2, 19.3, 6.24, 210, 215, 216; 280/DIG. 5
See application file for complete search history.

(56) References Cited

U.S. PATENT DOCUMENTS

| | | | | |
|---|---|---|---|---|
| 3,232,367 | A * | 2/1966 | York | 180/19.1 |
| 3,247,923 | A * | 4/1966 | Cornell | 180/19.1 |
| 3,820,617 | A * | 6/1974 | Groff | 180/19.1 |
| 3,941,198 | A * | 3/1976 | Kappas | 180/11 |
| 3,989,116 | A * | 11/1976 | Hirano | 180/19.3 |
| 4,081,047 | A * | 3/1978 | Lovell et al. | 180/19.3 |
| 4,356,875 | A * | 11/1982 | Clune | 180/13 |
| 4,429,758 | A * | 2/1984 | Meshulam | 180/19.3 |
| 4,570,732 | A * | 2/1986 | Craven | 180/19.3 |
| 4,799,697 | A * | 1/1989 | Williamson et al. | 280/3 |
| 4,974,693 | A * | 12/1990 | Nakai et al. | 180/19.3 |
| 5,161,635 | A * | 11/1992 | Kiffe | 180/19.3 |
| 5,180,023 | A * | 1/1993 | Reimers | 180/19.1 |
| 5,265,686 | A * | 11/1993 | Machen | 180/169 |
| 5,350,982 | A * | 9/1994 | Seib | 318/139 |
| 5,375,673 | A * | 12/1994 | McCall et al. | 180/13 |
| 6,276,470 | B1 * | 8/2001 | Andreae et al. | 180/19.3 |
| 6,659,208 | B2 * | 12/2003 | Gaffney et al. | 180/19.2 |
| 6,732,823 | B2 * | 5/2004 | Furuta | 180/19.2 |

* cited by examiner

*Primary Examiner*—Tony Winner (57) ABSTRACT

A front-wheel motor powered golf trolley comprised of a compact backward tricycle-wheel arrangement and a lightweight stiff open truss chassis. Left and right front wheel assemblies, driven by common drive axle, motorized through silent motor speed reduction, pull the trolley in an easily guided walk-along fashion. The driven front wheels are compliantly isolated from the chassis by sprung front axle support arms. Trolley stance stabilization and steering are by an independently sprung rear wheel/pivot assembly, the pivot being located between the front drive and rear wheel axles. A steering handle is the user-guiding interface and location for all hand operated controls. Upper and lower golf bag supports fold out from the chassis. Stow-ability is compact and without bulkiness. This trolley is adaptable to remote control of power, steering, and braking functions. The trolley also accommodates multiple other user conveniences.

6 Claims, 11 Drawing Sheets

FRONT WHEEL MOTOR DRIVEN-GOLF TROLLEY

CROSS-REFERENCE TO RELATED APPLICATIONS

This application is a non-provisional of 60/474,139, titled: {Front Wheel Motor Driven—Golf Trolley}, authored and submitted by this inventor on May 29, 2003.

REFERENCES CITED

| U.S. Pat. Documents | | |
| --- | --- | --- |
| 2962106 | November 1960 | Burnside |
| 3232367 | February 1966 | York |
| 4356875 | November 1982 | Clune |
| 3150736 | September 1964 | Kaufman |
| 3247923 | April 1966 | Cornell |
| 3820617 | June 1974 | Groff |
| 3989116 | November 1976 | Hirano |
| 4570732 | February 1986 | Craven |
| 4550930 | November 1985 | Proffit |

DESCRIPTION OF THE PRIOR AND PRESENT STATE-OF-THE-ART (SOA)

The purpose of this invention is to assist a walking golfer by providing a means for easily and conveniently transporting a golf club bag, its contents and other golfer needs during a round of golf. Prior and present art has been the motorization of the pull-cart (trolleys) in a configuration similar to hand pull-cart design (though some motorized designs resemble a push-cart). Such design has been extremely useful in assisting a golfer, making it possible to play golf unencumbered from the task of managing the physical transport of their equipment. Design evolution of the golf trolley has been significant based on the number of available design variants of the past and those available today. However, all have been patterned in the same way, as variants of the original hand pull-carts.

It is apparent from this invention disclosure; state-of-the-art (SOA) design emphasis has been only on improving the design concept of the original pull and/or pushcart. No other developed trolley seems to have recognized and adapted its design to be inclusive of and attentive to a full use-cycle set of user needs. The trolley of this disclosure is based on such an analysis process, to include establishing use/need requirements, inclusive of the full use cycle, specifics being: the basic trolley function, ease of field build-up/breakdown, component assembly-disassembly interdependence, stowage, maintenance, and other direct and indirect convenience accommodation.

This invention design addresses all trolley basic use/need requirements and present trolley design shortcomings. This invention presents a new concept that, when taken as a whole, creates a new design for golf trolleys. Specifically, this invention configuration addresses user found shortcomings of the current state-of-the-art (SOA). Examples of such shortcomings in the current (SOA) are summarized below:

1) A golf trolley, to be most useful, must be user friendly in every way in which it is used and/or prepared and transported for its use. In today's (SOA) designs, parts are heavy, difficult to handle, and often bulky, making build-up/breakdown, and transport in a typical automobile less than satisfactory. Transport of more than a single trolley with golf equipment is usually out of the question in a passenger car.
2) In the intended use of conveying a golf bag with its contents, (SOA) trolleys over time become structurally degraded (loose at the joints) implying a lack of overall quality in long-term design, the assembly/disassembly interfaces being the main issue.
3) In use, tip-over is an inherent characteristic of remotely operated trolleys, unless equipped with a bogey $4^{th}$ wheel. Wheel hang-up, a condition that immobilizes a remotely controlled golf trolley then becomes a characteristic of bogey wheel equipped trolleys.
4) For trolleys that are attended in a walk-along fashion, there is inherent in trolley (SOA) configurations a need to continuously correct the path of the trolley, both because of the chosen walking path about the golf course, and because (SOA) trolleys tend to wander due to misalignment or fatigue at buildup/breakdown interfaces. Significant directional force actions by the user are required to redirect (SOA) trolleys.
5) In the unfortunate situation that during play, a golf trolley power source is diminished to the point that the trolley must be pushed to finish golf play, nearly all motorized designs become terribly unfriendly. It now becomes a struggle to get the trolley and the golf equipment back to the clubhouse. If the user is not strong, then there can be an even bigger problem. (Note: The trolley of this disclosure has anticipated this possibility and has so designed its chassis that steering handle push forces apply themselves directly in harmony with chassis natural structural paths acting just as one would be pushing a small hand mower. Force-line-of-actions are imparted very directly to the wheels without much real lost pushing effort. (This trolley un-powered is nearly as easy to push as an un-motorized pushcart, though substantially heavier.)
6) Most (SOA) trolleys are not field-service friendly, require high maintenance, and may disassemble in a manner that exposes lubricated surfaces and/or electrical connections.
7) Present trolley state-of-the-art is focused on highly integrated design requiring full trolley servicing, (meaning in many cases factory return of the whole trolley), rather than to allow servicing of just a trolley assembly, subassembly, or component to which fault can be assigned.
8) Options are not well integrated in (SOA) trolley design and present an after-thought appearance.

Even the most expensive (SOA) trolleys are characterized by some of these shortcomings. Some (SOA) designs address the above-mentioned design weaknesses better than others, but usually at an expense of weight or some other unwieldy or user-unfriendly characteristic.

To be a truly integrated golf trolley, design of the basic configuration layout needs to be changed. This invention, with its front-wheel motor driven layout and a trailing pivoted stabilizing rear wheel, exhibits highly desirable use characteristics of the trolley golf bag transport function, and also harmonizes with the other important functional requirements of its usability cycle. This invention features compactness in size, stability in footing, power train efficiency, and ease of trolley guidance, all wrapped in a design which makes field serviceability a meaningful term, since trolley functional assemblies easily and practically interface one with another. The fully assembled size compactness of this trolley and its un-powered maneuverability characteristic also mean less stowage area required at golfing facilities used to house and/or store trolleys.

BRIEF SUMMARY OF THE INVENTION

Figures 1, 2:
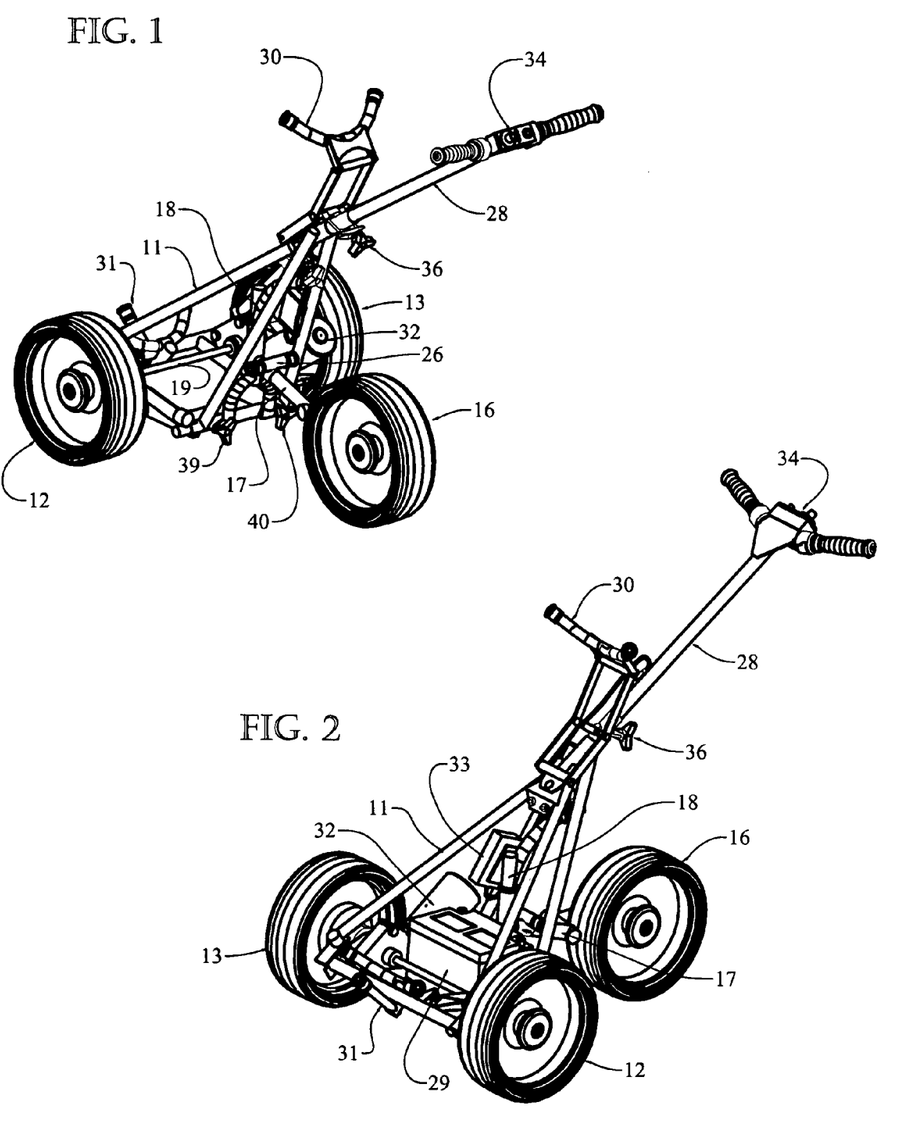
FIG. 1 and FIG. 2 are perspective views of the overall design layout in basic configuration shown from different angles.
Figure 3:
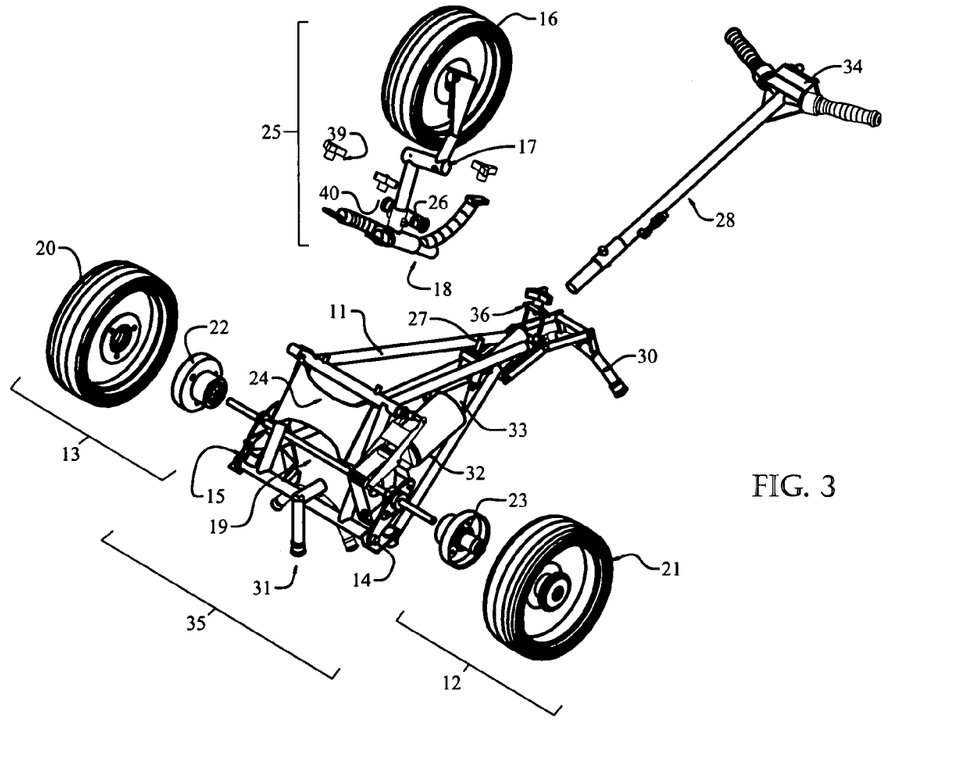
FIG. 3 is a perspective view showing the invention three main assemblies: 1) the primary structure with drive wheels; 2) the rear wheel/pivot assembly; and 3) the steering handle.

This invention is a front wheel motorized golf trolley (10) of compact and structurally rigid design. The invention, shown in FIG. 1 and FIG. 2, consists of a highly stiff triangulated chassis (11) adapted and integrated with a reverse tricycle wheel footprint arrangement, the two front wheel assemblies (12) and (13) being motorized to pull the invention in an easily guided walk-along fashion. The driven front wheels are compliantly isolated from the rigid chassis (11) by sprung front axle support arms (14) and (15) FIG. 3. A third wheel, the rear (16), supported by an asymmetric rear axle support arm (17), trails the two front wheels, and is allowed to pivot within limits about a centrally located near-vertical fork supported bearing (18). This rear wheel (16) provides full stability.

Unique to this invention is the configuration layout and what it brings to the whole experience of walk assisted vehicle mechanization for a golf trolley. When under power, the two front wheels are driven by a common motorized drive axle (19). The drive axle transmits torque to each front wheel assembly (12) and (13). Front wheel assemblies are each an integrated tire/drive-wheel [(20) left and (21) right], and axle-hub assembly [(22) left and (23) right], {comprising of a housing, bearings, a freewheel clutch, wheel interfaces, and magnetic wheel locks} FIG. 3. Each axle-hub assembly (22) and (23) is designed to protect sensitive components from the rigors of the elements, post-play cleanup, and buildup/breakdown. The axle hub design reduces the length of the common drive axle, thereby reducing transport and stowage volumetric dimensions.

The trailing rear wheel (16) and asymmetric rear axle support arm (17), together pivot about the fork supported bearing assembly (18), mounted aft of the driven axle just behind a low centrally located battery (24) cradle. This arrangement offers excellent stability and tracking when under power or not. Fingertip steering is the experience afforded by this arrangement. Hill climbing abilities are superior to rear wheel driven trolleys in that tip back tendencies are fully compensated by the rear wheel. Because of the invention tip back stability, this trolley can be used to assist the user in any up-hill climb. A rear wheel/pivot assembly (25) {comprising of the rear wheel (16), the fork supported bearing assembly (18), the asymmetric rear axle support arm (17), and the adjustable wheel pivot stops (26)}, is spring compliant when secured to the chassis (11) at the top fork spring interface (27) for a golf bag soft ride.

The golf trolley chassis (11) is a non-collapsible, open and highly triangulated, affording a high stiffness-to-weight design and amenity accommodation without strength or stiffness compromise. Its layout offers much flexibility for inclusion of comfort optional convenience attachments. The openness of the chassis (11) structure makes possible integrated transport and/or stowage (nested) envelopes. The rear wheel/pivot assembly (25), the steering handle (28), and the battery (29) are able to nest around the chassis (11) with compactness as shown in the stowed configuration FIG. 4. Upper and lower golf bag supports (30) and (31), are foldable into the chassis openness (11).

Key to this golf trolley invention are the front-wheel assembly/chassis (12), (13)/(11), and rear wheel/pivot assembly/chassis (25), (11) compliances (14), (15), and (27). The front axle support arms (14), (15) act to isolate the chassis and golf bag equipments from the rigors of constant jostle when moving the trolley over rough ground. The rear wheel/pivot assembly (25) upper fork spring interface compliance (27) acts to mitigate over-turning rear wheel bump forces that act on the chassis (11) from time to time when on rough terrain.

The front axle (19) is motor driven by the output gearing of an integrated motor speed-reducing assembly (32). The drive motor is controlled by pulse-width-modulation (PWM) electronics (33). Stored electrical energy is from a deep cycle 12VDC battery (29). Motor electronics control is thru a control box (34) affixed to the double grip steering handle (28). [At field build-up/breakdown, the steering handle (28) becomes a simple near-flat structure with only an attached motor control (34), and no electrical pigtail encumbrances.]

Figure 5:
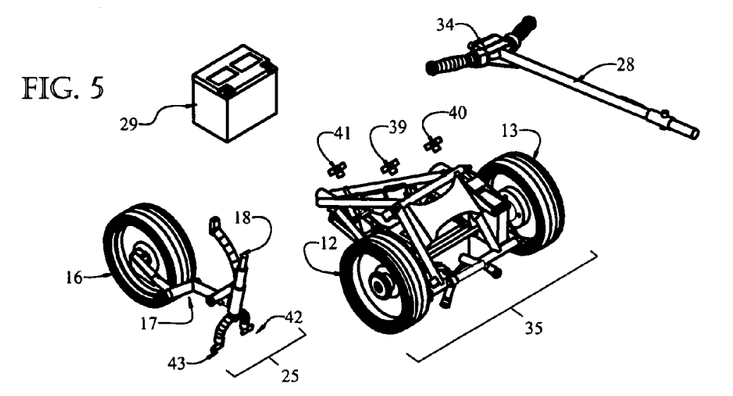
FIG. 5 is a perspective view showing the field breakdown elements of the invention.

Field build-up/breakdown consists essentially of putting together three assemblies, FIG. 5, or taking apart those same assemblies at rugged interfaces. Those three assemblies are:
1) A main trolley assembly (35); {defined to be the chassis, all front-wheel mechanical drive elements including the front wheel axle-hubs, the integrated motor speed-reducing assembly, the drive axle, its support and stabilization, the battery cradle, the motor control electronics, rear wheel/pivot assembly interfaces, and the upper and lower bag supports} with tire/drive-wheels (20), and (21) attached:
2) A rear wheel/pivot assembly (25); and
3) A steering-handle assembly (28).

Figure 4:
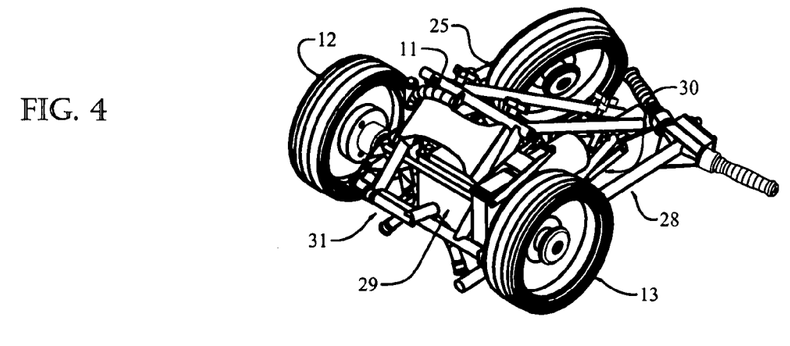
FIG. 4 is a perspective view showing one of many ways these assemblies nest together for transport.
Figure 6:
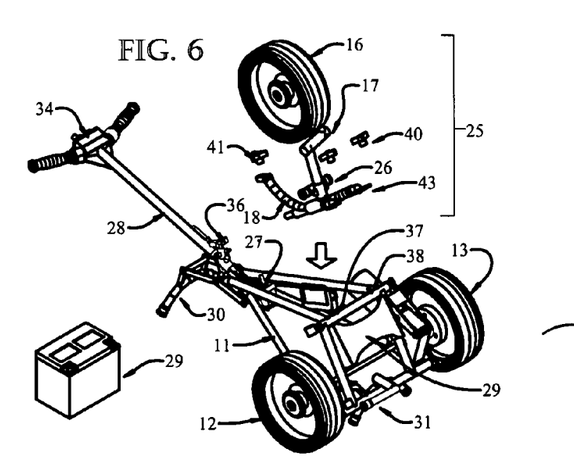
FIG. 6 is a perspective view showing field assembly steps 1) and 2): steering handle buildup; followed by rear wheel/pivot assembly build-up.
Figure 7:
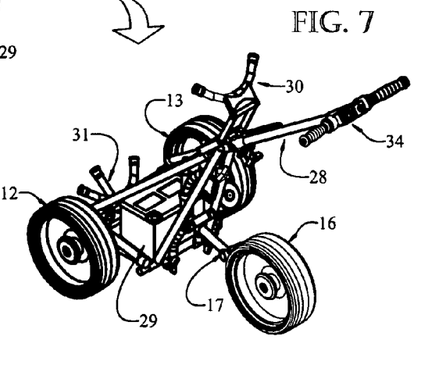
FIG. 7 is an perspective view showing the final build-up step 3), trolley turned upright and battery hookup.

A recommended three-step procedure for build-up follows and is depicted in the sequence of FIGS. 5, 6, and 7, starting from a put-away/stowed arrangement of FIG. 4.
  STEP 1: Place the main trolley assembly, with front tire/drive-wheels (20) and (21) attached, on the ground upside down, and at the same time, rotate the upper bag support (30) into its deployed position. The main trolley assembly is now stable FIG. 5 to FIG. 6, resting on the two front drive wheels and the yoke ends of the upper bag support. {Note: while front drive wheels are removable from the front wheel hubs, such breakdown is usually not exercised}. Next, rotate an upper bag locking clamp devise (36) to a position above the steering handle chassis interface. Next, insert the steering handle (28) into the chassis (11) at the steering handle chassis interface, then lock in place the upper bag support and steering handle using the clamping-lock (36) attached to upper bag support (30) FIG. 6.
  STEP 2: Position the rear wheel/pivot assembly (25) above the inverted the main trolley assembly. Engage the lower and upper fork chassis interfaces (37), (38), and (27), and secure the rear wheel/pivot assembly (25) to the chassis (11) at the three points with hand nuts (39), (40), and (41).
  STEP 3: Pivot the trolley up and over, rotating about the front wheel axle to position the rear wheel (16) on the ground. Unfold the lower bag support (31). Place the battery (29) in position and electrically hookup. Optional convenience assemblies are then in any order attached as desired. Field breakdown is in reverse order.

BRIEF DESCRIPTION OF THE DRAWINGS

The drawings form part of the specification hereof. With respect to the drawings, the following is briefly noted:

FIG. 13A and FIG. 13E are views of the steering linkage from above and below angles;

FIG. 13B through FIG. 13D show views of the steering linkage positioning for left turn, straight, and right turn functionality;

FIG. 14A is a use positioning view of the rest seat;

FIG. 14B is a nonuse positioning view of the rest seat;

INVENTION DESCRIPTION

Figure 15:
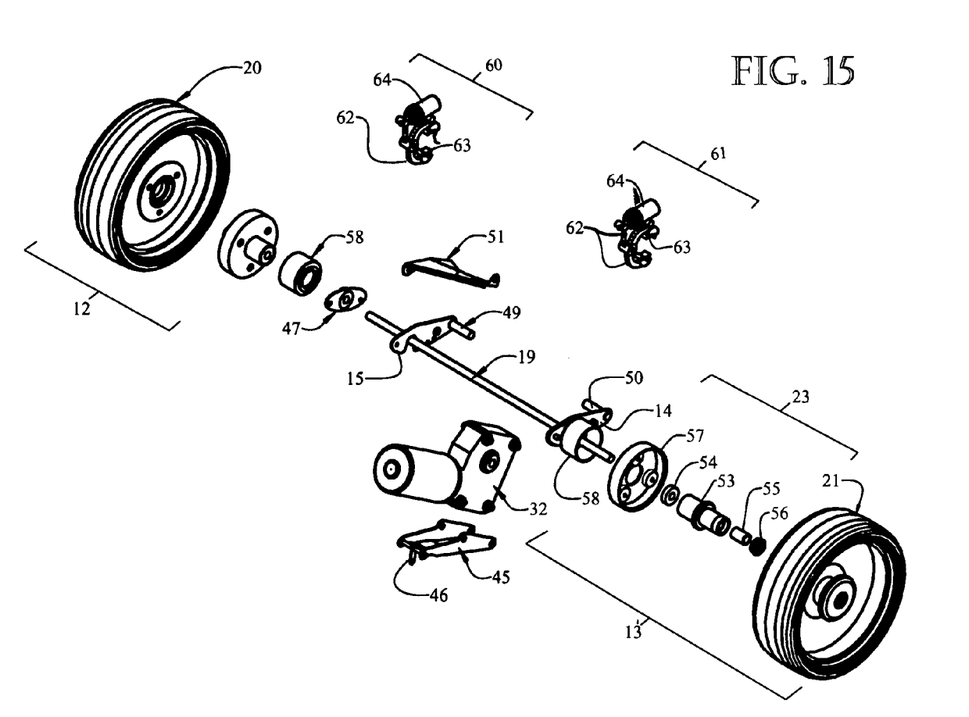
FIG. 15 is an exploded view of the drive axle, bearing support, axle stabilizer, drive motor assembly, each wheel hub, wheel, and optional brakes.

The walk along golf trolley of this invention presented in the drawings referenced above is powered by its two front wheels, turned by transmission of power through a common drive axle (19), such that, through torque carrying wheel axle hubs (22) left and (23) right, the left (20) and right (21) front wheels turn so as to provide a forward pulling motion (FIG. 15). Powering the drive axle (19) is a geared motor speed-reducing assembly (32), powered by a single (SOA) 12 VDC electric motor. {The motor speed reduction assembly (32) shown is (SOA) worm gearing, but other implementations of motor speed reduction include pinion gear, or belt drive approaches.} Both front wheel axle hubs (22), (23), use a free-wheel clutch arrangement to allow forward hand-pushing and maneuvering of the trolley when not under motorized control. The front wheel drive axle is forwardly positioned referenced to the trolley center of gravity (CG), and carries about ⅔rds of the gross trolley and golf equipment weight, affording good traction, particularly when required for both hill climbing ability and for soft and wet ground passage.

Figures 9, 10:
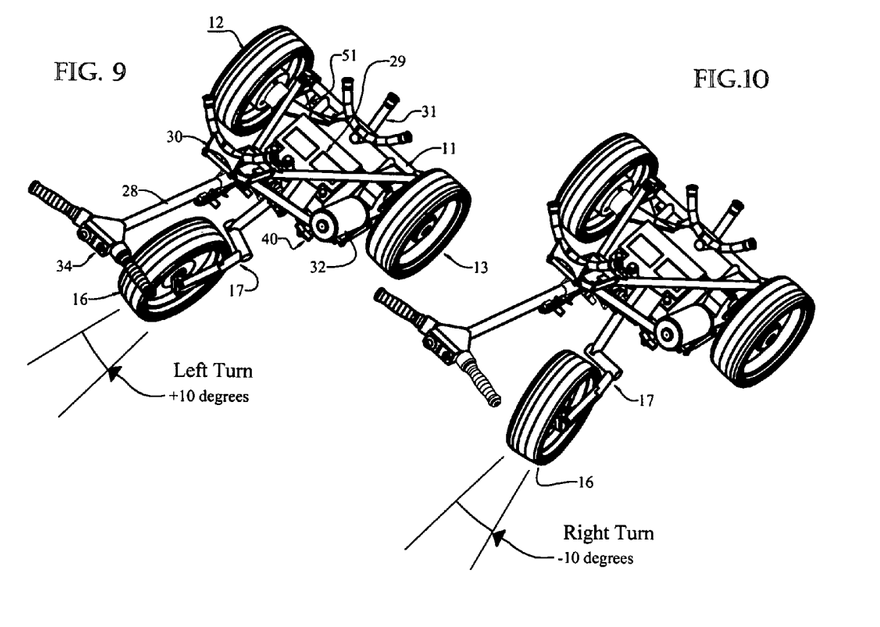
FIG. 9 and FIG. 10 show perspective views of the rear wheel/pivot assembly at steering position limits so as to affect left and right turns.
Figure 16:
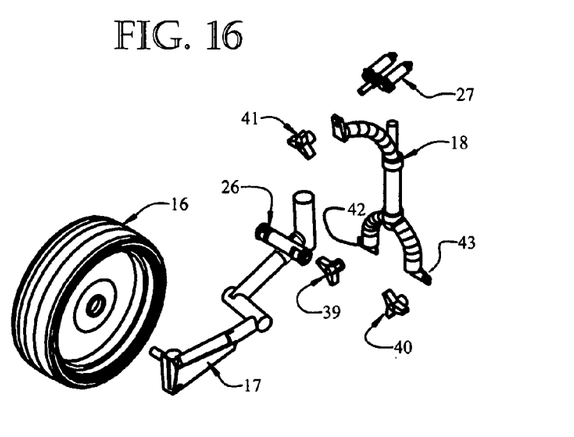
FIG. 16 is an exploded view of the rear wheel/pivot assembly.

A trailing rear wheel (16), centered to the rear of the forward driven wheel assemblies (12) and (13), is supported by the asymmetric rear wheel support arm assembly (17) and stabilizes the golf trolley invention design (FIG. 16). The trailing rear wheel support arm assembly (17) is secured to a fork supported bearing assembly (18), mounted aft of the driving axle (19) just behind a centrally located battery cradle (24). The trailing rear wheel/pivot assembly (25) is allowed to freely pivot within adjustable constraints (FIG. 9 and FIG. 10) behind the primary chassis (11) somewhat forward of the wheelbase mid-point location, offering the user the ability to steer from the steering handle (28) using a finger tip light-effort push, a side-to-side motion, without need to reposition the invention direction by lifting the stabilizing third wheel as is required by other walk along motorized and non-motorized golf pushcart designs. When infrequent tight maneuvering situations occur, the golf trolley is redirected by lifting the steering handle so as to also lift also the stabilizing rear wheel, thereby allowing essentially unlimited maneuvering capability about the two front wheels.

Figure 8:
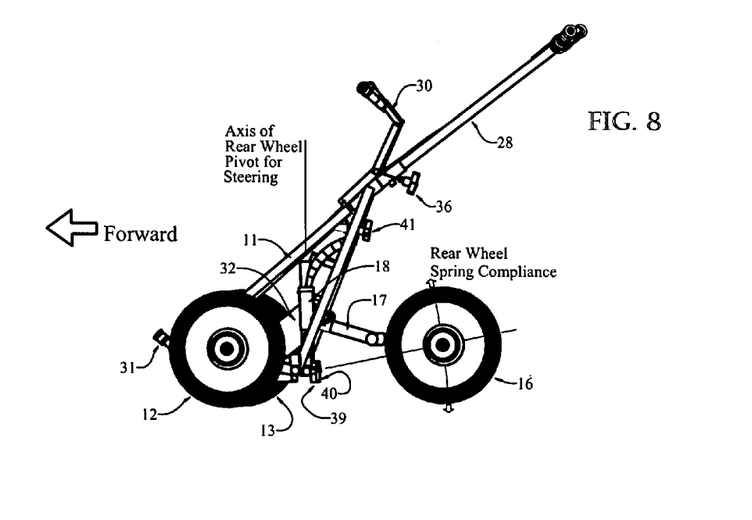
FIG. 8 is a side view of the invention, showing the pivot axis for rear wheel steering and spring compliance of the rear wheel.

The trolley chassis (11) is an open robust structure with inherent stiffness and ruggedness afforded by its triangulated truss design, from which are attached, foldout upper (30) and lower (31) golf bag supports. The rear wheel/pivot assembly (25) is secured to the primary chassis (11), as shown in FIG. 6, at the fork supported bearing assembly (18) three point interface. This fork supported bearing assembly (18) attaches to the chassis (11) at two chassis bolt interfaces (37) and (38), held in place by two hand nuts (39) and (40). The top of the fork supported bearing assembly (18), also secured with a hand nut (41), is attached through a spring-loaded linkage (27) that allows compliance for up/down motion of the rear wheel support arm (17), being accommodated by small flexure interfaces (42) and (43) which are part of the fork supported bearing assembly (18). Such flexure and rear wheel up/down motions would be viewable from a side view (FIG. 8). The upper fork chassis interface (27) attachment statically holds to a fixed loaded position, but when forces change due to changing or dynamic loading of rear wheel, compliance is accommodated through the sprung linkage of the upper fork interface (27). Linkage positioning and securing to the chassis within limits is adjustable to effectively raise or lower steering handle ground height of the steering handle grips by +/−1.5 inches.

Figure 17:
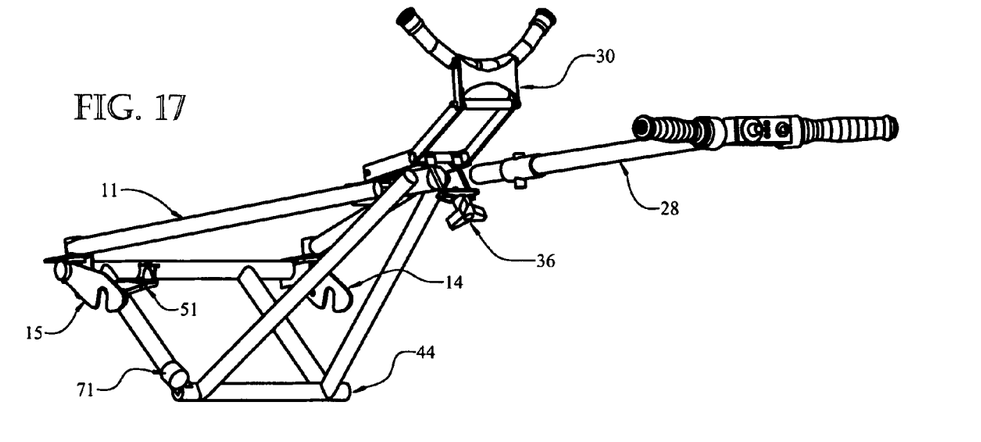
FIG. 17 is a view of the primary structure with emphasis on the steering handle interface.

A single piece steering handle (28) attaches to the chassis (11) and is locked in place by the upper bag support-locking clamp (36) that, when engaged and secured, also locks in place the upper bag support (30) (FIG. 17).

Mounted centrally in the chassis (11) and at the lowest place possible is the battery cradle (24). This location assures the invention the lowest center-of-gravity possible and benefits stability.

The motor speed-reducing drive assembly (32) driving gear attaches directly to and is supported by the drive axle (19). The chassis (11) reacts to drive assembly (32) applied torque at a single chassis attachment point (44), through a tailored motor speed-reducing drive assembly mounting interface bracket (45) attached to a short linkage (46), said linkage thereby reacting only to drive-axle implied torques and motor speed-reducing assembly weight. No chassis imposed forces or alignment issues are imposed on the motor speed-reducing drive assembly by the chassis.

Figure 11:
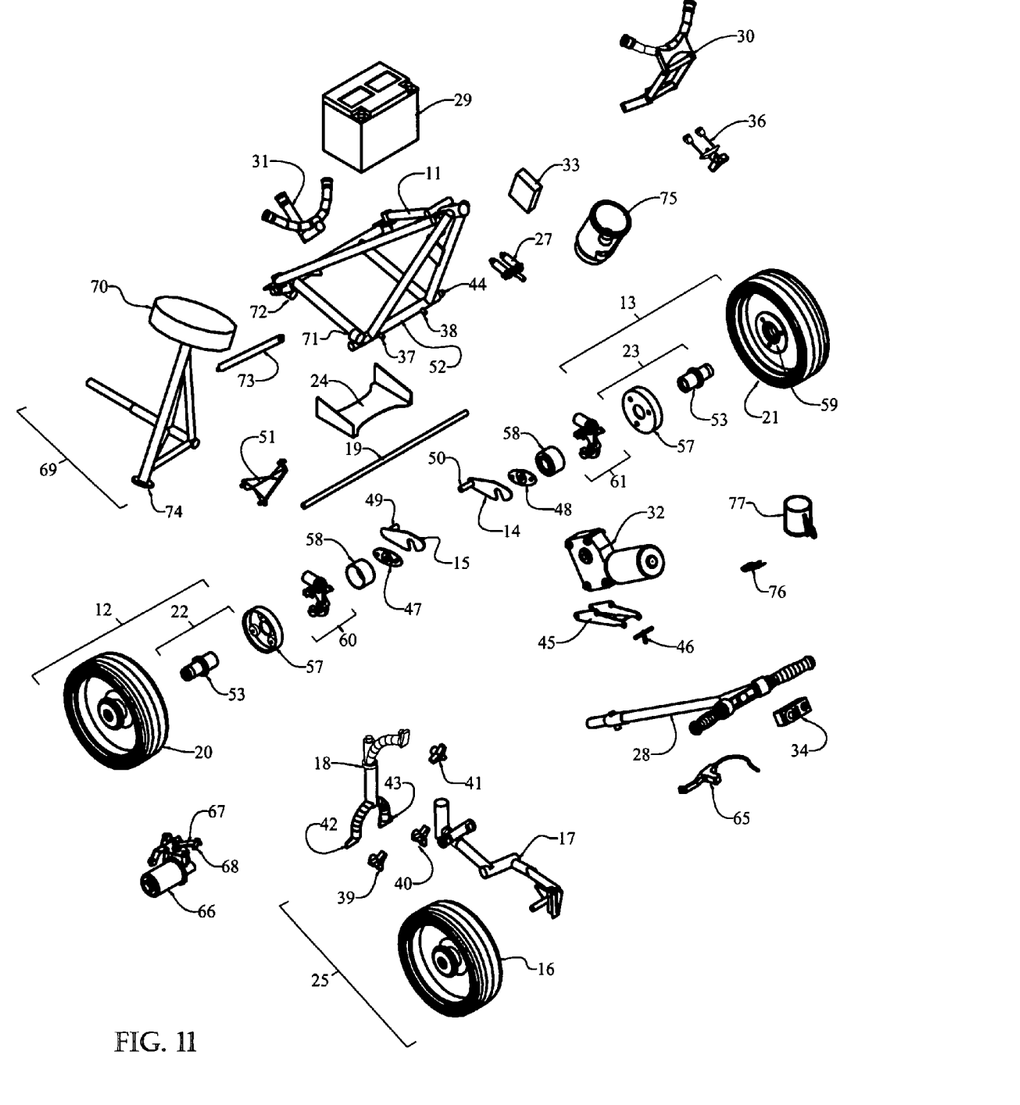
FIG. 11 is an exploded view of the invention components (including convenience accessories and remote-control elements)
Figure 12:
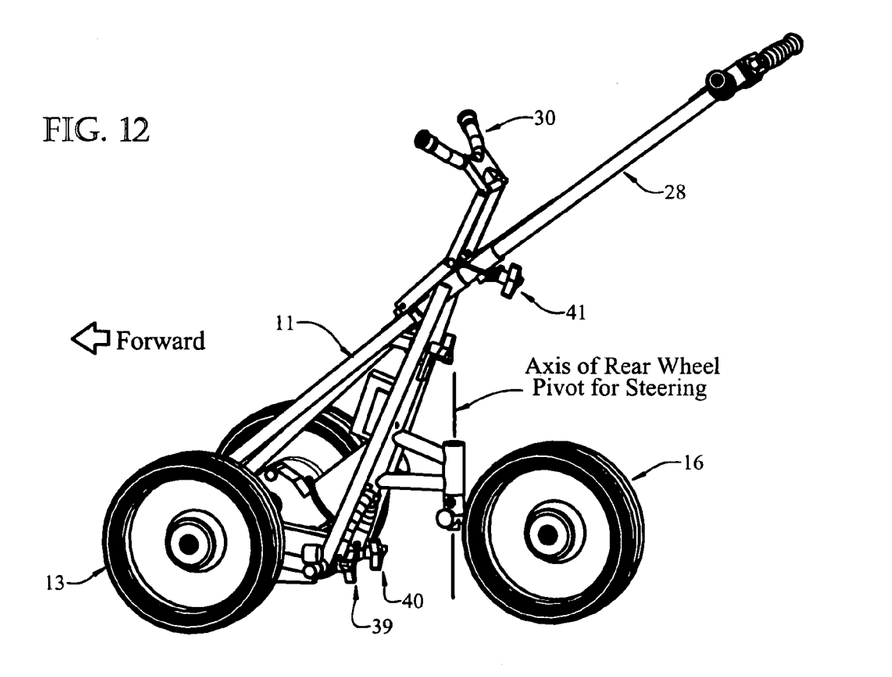
FIG. 12 is a side view of the trolley configuration that locates the rear wheel pivot closest to the rear wheel.
Figure 18:
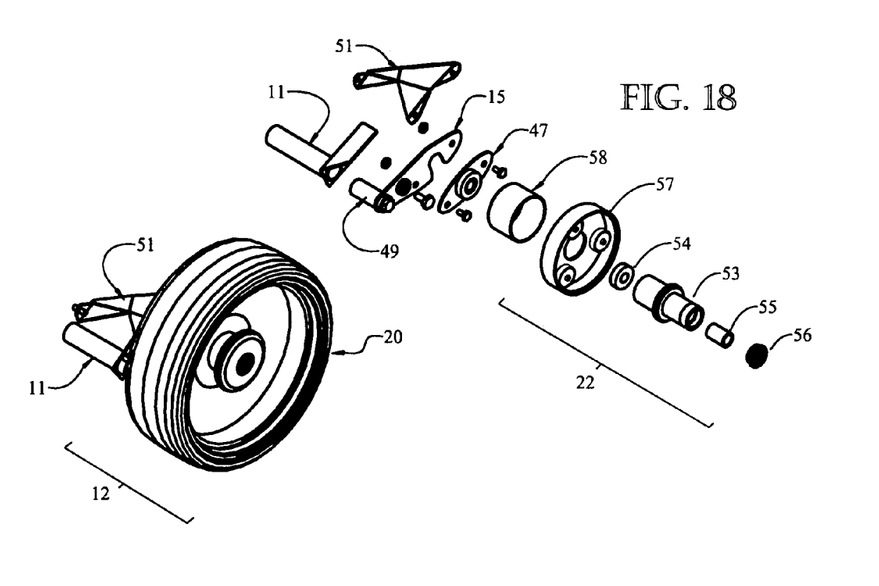
FIG. 18 is an exploded view of the front powered wheel support elements.

To be practical, this golf trolley must provide a soft ride for the supported golf equipment. This is made possible by key and necessary compliant wheel supports. Front-axle support arms (14) & (15) support the front wheel assemblies (12) & (13), through the common drive axle (19), [using sealed ball-bearing assembly interfaces (47) and (48)], such front-axle support arms compliances being provided by rubber bushing mounts (49) and (50), part of the front-axle support arms (FIG. 15 and FIG. 18). Rear wheel compliance is through the mounting interfaces of the rear wheel/pivot assembly (37) (38) and (27), (FIG. 6 and FIG. 11). Wheel jostle induced motions are muted by these compliant wheel supports and attenuate shock load inputs to the chassis (11). Without the isolating and attenuating design elements (42), (43), and (27), the application of this configuration to a golf trolley application is less than satisfactory. A lateral motion stabilizer link (51) provides necessary side-to-side stability for the front wheels. Soft tire materials or pneumatic tires provide additional isolation, but alone are insufficient to get the desired soft ride.

Invention design characteristics of a low CG, minimum wheelbase dimension, significant use of high strength and/or reinforced plastics, aluminum construction materials as appropriate, and its overall compact design, together benefit the transport part of the use cycle. The design offers a transport-handling interface (52), a part of the chassis (11), and manageable lightweight assemblies (25) and (28).

Figure 19:
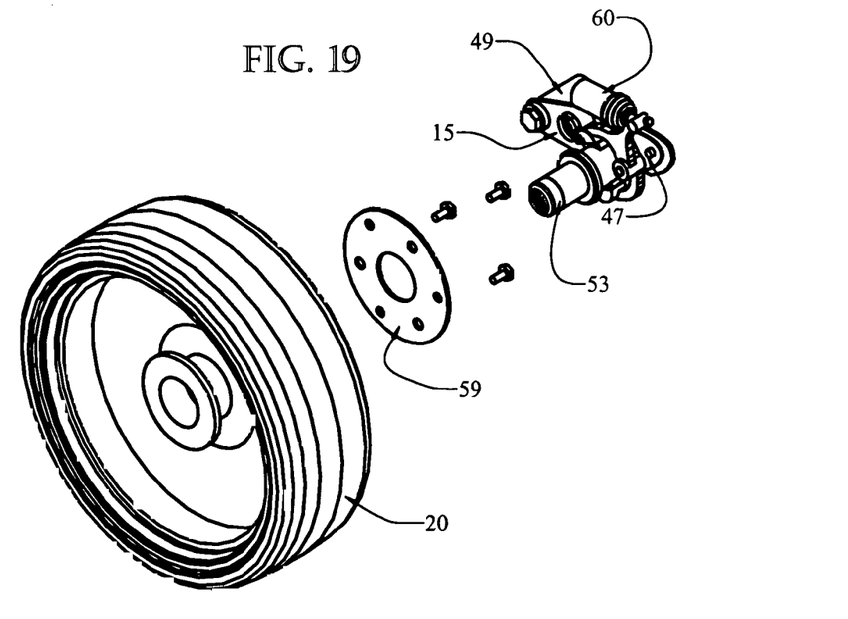
FIG. 19 is an exploded view of the magnetic drive surface that holds to the magnetic wheel locks.
Figure 20:
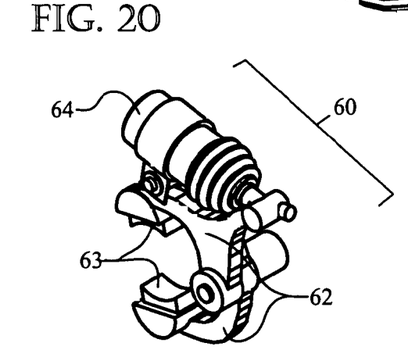
FIG. 20 is a view of an electromechanical front wheel scissor arm hub brake.
Figure 21:
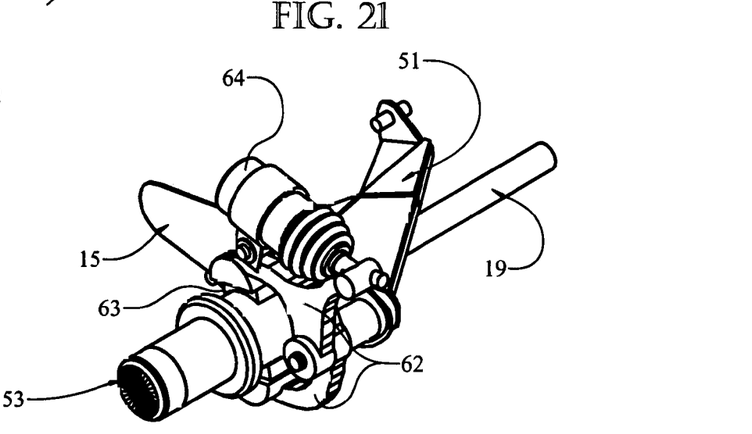
FIG. 21 is a view of the hub brake of FIG. 20 shown with the axle/brake support and wheel hub.

Front drive-wheel assemblies (12) and (13), [shown for left wheel in FIG. 18], each include a wheel and tire (20) and (21), and an axle-hub assembly (22) and (23) including a magnetic wheel lock (57). The axle-hub assembly comprises the following: a hub housing (53j, a hub bearing (54), an outboard mounted freewheel clutch (55) {left hub free counterclockwise, right hub free clockwise}, a hub keeper (56), a magnetic wheel lock (57), and a protective hub cover (58). These axle-hub assemblies (22) and (23), assure field build-up/break-downs are grease/oil-free and that the user is able to clean down this trolley without deteriorating the wheel axle-hub parts. The axle-hub assemblies are sealed to protect its sensitive components from the rigors of the elements and post play cleanup. Each front drive-wheel assembly provides for a user-friendly quick off/on magnetically held ("locked") wheel. Both magnetic wheel locks (57) have the same torque pin pattern making left and right drive wheel and tire units (20) and (21) interchangeable. Each left and right drive wheel and tire units (20) and (21) have an integrated magnetic metal surface (59) to which the magnetic wheel locks align and hold [shown for left wheel in FIG. 19].

The motor controller (33) is a PWM design specifically tailored to ramp up and down voltage levels for smooth acceleration and deceleration. The power control box (34) has an on/off switch, voltage level control, and state-of-charge indicator circuits and lights. The power control box (34) is connected to the motor controller (33) mounted at the steering handle (28) base.

This invention includes provisions for:
1) Electro-mechanical front wheel hand-control brakes.
2) Full remote-control operation for motor speed control, steering, and front-wheel braking,
3) Add-on accessory accommodations, specifics which include, a rest seat (69), a holder for divot mix bottles (75), scorecard (76) and drink holder (77) attachments.

Figure 13:
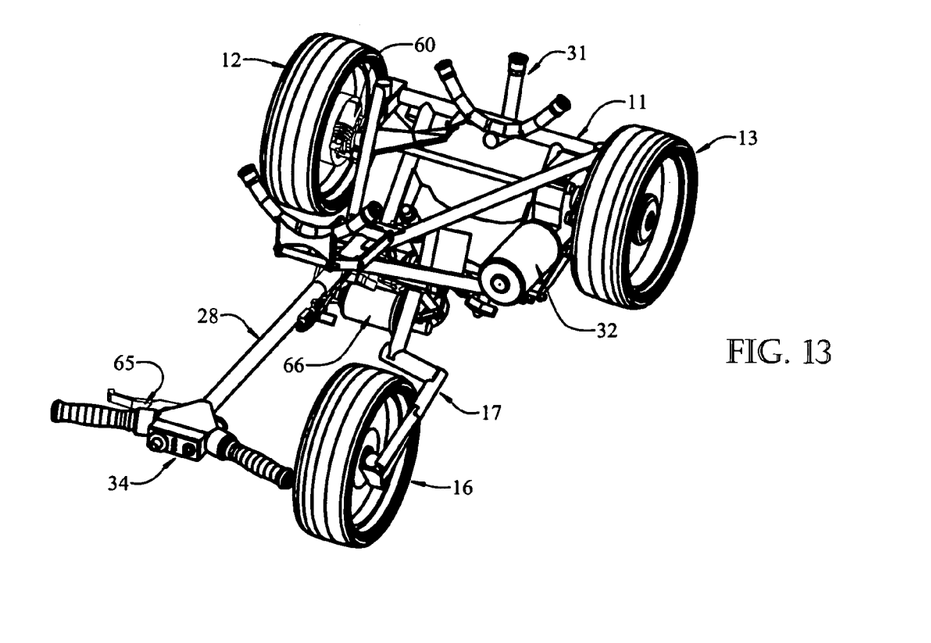
FIG. 13 is a view of the trolley adapted for remote control.
Figure 14:
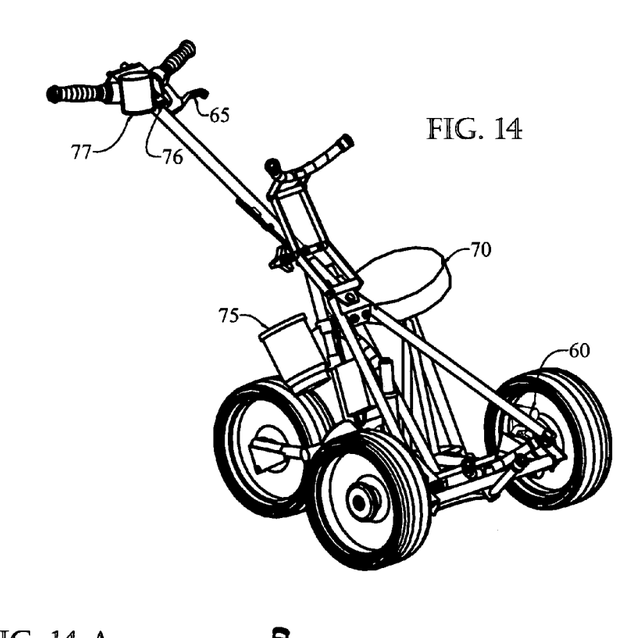
FIG. 14 is a view of the trolley with convenience accessories.

1) Electro-mechanical Front Wheel Hand Control Brake:

The golf trolley of this invention is compatible with the use of a pair of electromechanical front wheel brakes for a braking function (FIGS. 15, 19, 20, and 21). Such electromechanical brakes for this trolley, when installed, become integrated with the main trolley assembly. The electromechanical front-wheel brakes are composed of two independent braking elements (60) and (61) that act to brake independently each of the two front (left and right) sub-axle assemblies. Each brake is of a side-pull bicycle design, acting on the outer surface of a sub-axle assembly, just inside the magnetic wheel attachment. Each brake is comprised of a scissor-arm pair (62), with each arm holding opposing brake clamping shoes (63), both of which act through the axis of sub-axle rotation. Each braking arm (62) is attached and secured at the same point to a front-axle support arm, which also holds the drive axle in place. For each front wheel, braking actuation is by control of a pull solenoid (64), acting to pull the scissor arms of the brake together, thereby applying a clamping brake-effect on the affected sub-axle to slow or stop its rotational motion. Reactive brake, induced force is reacted through the front-axle support arm. Solenoid controller functions are built into the motor-controller electronics. The user-braking interface is by a handlebar hand brake (65), mounted on the steering handle (FIGS. 11, 13, and 14). The user actuated hand brake acts to modulate a voltage sent to each of the two braking solenoids. Encountered braking asymmetries are small, and are seamlessly resisted as if reacting to an apparent steering change force at the steering handle by the operator.

2) Full Remote-Control Operation of Power, Steering and Braking (FIG. 13)

The golf trolley of this invention includes design variants that adapt this golf trolley for remote control application, in the context of being useable as both remotely controlled and/or hands-on user controlled. Remote-control functionalities for this trolley use (SOA) transmitter/receiver technologies for motor control, for steering commands, and for solenoid braking control.

Motor control commands are Power On/Off, and Variable-Speed capability. Speed control is by (SOA) means. Power initiation is by combination of button control, requiring two simultaneous depressions for motor-on remote commanding. Remote-control operation requires a continuous RF link. In the event that the receiver drops transmitter signal, motor-controller functions are disabled stopping trolley front wheel drive power, and braking is applied for a specified time interval, sufficient to stop the trolley.

Remote steering is accomplished by remote-control limited powering and/or non-powering of a motorized rotary actuator (66) used to position the rear wheel support arm (17) to the right (for a right turn), left (for a left turn), or return it to a neutral (no turning) position. Remote steering component detail is shown in FIG. 13-a, {FIG. 13-b (left turn), FIG. 13-c (straight), FIG. 13-d (right turn),} and FIG. 13-d. The steering actuation is by the dual direction capability of the motorized geared rotary actuator (66), able to move its rotary steering arm (67) through limited clockwise or counterclockwise angles. The rotary steering arm (67) acts on the rear wheel support arm (17) through a steering link (68), such as to control pivoting actions of the rear wheel support arm (17) about the fork supported bearing assembly (18). The steering actuator (66) attaches to the lower portion of the fork supported bearing assembly (18), and presents a cabling electrical interface to the motor controller (33), for the steering control electronics. Steering control electronics are piggybacked on the steering actuator housing (66).

Steering angles of the rear wheel assembly are equivalent, whether steering is by manual [directing of the steering handle (28)], or by remote control. The two steering methods are mutually exclusive, meaning that when set up to be a remotely steered golf trolley, the trolley is no longer steerable as is a trolley without remote steering, due to the connection of the actuator linkage (68) to the rear wheel support assembly (17). Remote steering is field changeable to manual steering, but requires a disconnection of the steering link (68) from the rear wheel support arm (17).

When in a remote steering mode, steering commands are routed by (SOA) means from the drive control electronics (33) to the steering electronics, which limits the maximum amount of left or right turning angle allowed. When steering commands are no longer actively present, the steering control electronics returns the rear wheel assembly (25) to its neutral position, effecting the finishing of the turn. Vernier control of the neutral position is a feature of remote commanding, in that adjustments to the neutral position are also controllable by (SOA) remote control functionalities.

Remote front-wheel braking is identical to the electromechanical front-wheel hand control brake, except that a braking activation source by the RF remote-control link from the drive control electronics (33) is added. The manual handlebar hand brake remains functional, thereby allowing the user to apply a braking function in either of two ways, manual or by remote, whichever is the most convenient. Whenever remote or manual braking is applied, all drive motor commanding is shutdown. Recommencing of the remote motor control is required to again activate trolley motor controlled functions. Remote controlled braking and the hand brake option are mutually inclusive.

3) Add-on Accessory Accommodations,

The golf trolley of this invention makes accommodation for convenience accessories. Accessory accommodation is in such a way as to effect a totally integrated and harmonized design. Design of these convenience accessories takes into account the usefulness of the accessory, its accessibility and functionality, and the buildup/breakdown issues of handleability and storability.

Rest Seat: (FIGS. 11 and 14)

The rest seat (69) is a single integrated lightweight structure with seat (70) designed to pin-hinge from two low point chassis attachments (71 & 72) of the chassis (11). The rest seat is held off the ground by a tension spring (73) that interfaces near the top of the fork supported bearing assembly (18). When to be used, the rest seat is pivoted down and away from the chassis (11) about the two low point chassis attachments (71 & 72) approximately 15 deg until the seat support foot (74) contacts the ground. The golf trolley provides rest seat (69) stability not offered in other golf trolley designs. FIG. 14 shows this option as installed on the invention. FIG. 14-a shows the rest seat (69), positioned for travel, from a different angle view attached to the chassis (11), the hinge pivot line, and typical ground clearance of the seat support foot (74). FIG. 14-b shows the in use position of the rest seat (69). The rest seat (69) is rotated outward and down, away from the chassis (11) about the hinge pivot line established by the chassis attachments (71&72), until the seat support foot (74) rests on the ground, providing a solid and stable trolley rest seat stance. The hinge like attachments (71&72) and the ground interface seat support foot (74) act together as three stable points about which the rigid rest seat structure (69) is held in position, assuring a solid and safe seat, without tip-over tendencies. This rest seat configuration also allows the user back support if desired by leaning on the trolley carried golf bag. When the rest seat is not in use, it snaps into a latch located high on the chassis (11) to assist the tension spring (73) hold the rest seat in its non-use traveling position aside the chassis. The rest seat, when stowed with the golf trolley, can be nested along side of the primary chassis so as to minimally affect the stowage volume.

Divot-Mix Container Accommodation: (FIGS. 11 and 14)

The primary chassis (11) truss tubular design layout accommodates a convenient location for the carrying of sand-grass-seed mixture bottle holders (75) in a convenient location for divot repair during play. FIG. 14 shows this option as installed on the invention.

Scorecard Clip and Cup Holder (FIGS. 11 and 14)

Scorecard clip (76) and cup (beverage) holder (77) accessories mount at the handle end of the steering handle, for easy reach, and so as not to require stooping for access. Locations chosen are also away from the golf bag and the golf clubs, particularly the cup holder.

Field Build-up/Break-down, Transportability, and Maintainability

Novel to this invention is the attention given to the whole use cycle of a golf trolley. In its world, field build-up/break-down, assembly/disassembly, stowage, and maintainable simplicity were high importance factors of the design optimization process used for this invention. A clean and minimum stowage volumetric was the design driver leading to the adoption of the open truss chassis structure (ii) and the axle hub assembly design (22) and (23). FIGS. 5, 6, and 7 show the field build-up/breakdown process. Highlights of this process are that the user builds-up and breaks-down the invention at rugged interfaces; bringing together or taking apart assemblies that won't slide or roll away during such processes. No annoying holding of unstable elements while in either build-up or breakdown is required.

Trolley breakdown and stowage for transport should certainly be compatible with automobile means of transport. The trolley should present a user-friendly design with a reasonable stowage volumetric and without element unwieldiness. Because of the open chassis structure, designed with stowage as an important requirement, approximate rectangular stowage dimensions are achieved in about 4 ft3. However, the actual triangular stowage volumetric is less than 3.5 ft3.

The Assembly Process:

The main trolley assembly is first placed bottom-up on the ground, while at the same time, the upper-bag support is unfolded, and the upper-bag clamping mechanism is rotated to await the inserting of the steering handle. FIG. 6 {Note: Wheel and tire assemblies, if not already installed, are positioned to slide onto and magnetically clamp in place as each wheel is positioned onto its axle hub.} The rear wheel/pivot assembly (25) is positioned (FIG. 6) and its fork supporting bearing flexures are mated at a pair of chassis retaining bolts (37) and (38), with hand nuts (39) and (40). The upper fork support linkage (27) is then secured with a hand nut (41) to the chassis (11).

The steering handle (28) is then slid into a chassis topside tubular interface and secured along with the upper-bag support (30) by means of the upper-bag support locking mechanism (36). The full assembly is then turned upright, allowing for the unfolding of the folded lower-bag (31) support FIG. (7). The invention is ready now for the battery (29) placement, for the golf bag equipments and other option installations as desired. Some options may be already attached to the chassis and not removed after initial installation. Such items might include the sand container holder (75), and/or attachments for beverages (77) and scorecards (76). Disassembly is reverse order. If it becomes desirable to remove the front wheel and tire assemblies (20) & (21), depending on the required level of disassembly, each is pulled off its axle hub axle (22) and (23), by a quick yank, of only sufficient force to release the wheel from the magnetic forces of the axle hub interface.

The invention design offers ease of field build-up with rugged assembly interfaces and simple locking mechanisms. Further, the openness of the chassis (11) and its tubular cross sections provide simple and ample accommodation of convenience accessory attachment. When fully assembled, the wheel base width is approximately 25 inches, a height of 35 inches, and a length of 46 inches.

Design Uniqueness

Invention configuration uniqueness is summarized by:
1) A reverse tricycle wheel arrangement; with two forward-powered wheels, and a following pivoting rear wheel;
2) The rugged primary open truss chassis, the enabling front-axle support arm suspension for the driven front wheels, the motorized gearing attachment to the drive axle and the chassis; and the rear wheel/pivoting assembly, inclusive of its chassis sprung interface;
3) A design tailoring to full use cycle requirements inclusive of a minimal and reasonable stowage volumetric and shape: the purposeful separation of the sub-element functionalities, desirable for maintainability in the overall use cycle, and the stability of the invention elements in build-up/breakdown.
4) Trolley handling ease, as if by fingertip, without frequent trolley wheel lifting maneuvers, and
5) The newness of trolley image and purpose, packaged with a compactness and wholeness of design, which is inclusive and in harmony with all option incorporations.

Invention dimensions and design element detail are for illustrative purposes, so as to convey an understanding of the overall invention configuration and innovation. Suffice to say that wheel diameters and widths shown represent the concept of the invention, and do not preclude incorporation of design variations, such design variants for example to include, but not limited to unequally sized wheel/tire diameters and widths. Similarly, this invention is to be perceived as compatible with a variety of motor drive options, belt, chain or direct drives, with either pinion or worm gear reduction, inclusive of motor mountings horizontal, transverse, or vertical.

I claim:

1. A golf trolley comprising:
   a. A reversed tricycle wheel arrangement, two front wheels, and a rear wheel, said rear wheel supported by a rear support arm so as to place a vertical axis for pivoting steering of said rear support arm about a point between said front wheels and said rear wheel;
   b. A non-collapsible triangulated primary chassis, said chassis providing interfaces for front bushing mounts, a lateral stability link, a rear wheel pivot assembly, a battery cradle, golf bag upper and lower supports, a steering handle, a drive motor/speed reduction assembly for propelling the front wheels, and a power control box for controlling said motor;
   c. Two-front-wheels support arms wherein each of said front support arms to include means to hold in place a bearing assembly, and further includes means to attach said stability link between a front axle and said chassis;
   d. A front-wheel-driven axle configuration, said configuration being that the front axle mainly supports said drive motor/speed assembly, said front axle also acting together with a short linkage;
   e. A front axle hub assembly, said axle hub assembly to include a hub housing, a hub bearing, a free wheel clutch, a protective cover, and means to align and secure a front wheel to said hub assembly;
   f. A locking mechanism, said locking mechanism used to jointly secure both said steering handle and said upper golf bag support to said chassis.

2. The golf trolley of claim 1, wherein said vertical axis is located closer to said front axle than a rear axle.

3. The golf trolley of claim 1, wherein said vertical axis is located closer to a rear axle than said front axle.

4. The golf trolley of claim 1, wherein braking is by hand actuated means, utilizing side-pull scissors brakes with activation by electrical solenoid.

5. The golf trolley of claim 1, wherein steering/driving/braking functions can be remotely operated.

6. The golf trolley of claim 1 further includes a swing down seat rest that connects to said chassis.

* * * * *